March 22, 1966 J. H. COWLES 3,241,641
OVER-RUNNING ROLLER CLUTCH WITH RESILIENT METAL CAGE
Filed Oct. 10, 1963 2 Sheets-Sheet 1

JOHN H. COWLES
INVENTOR

BY Mason, Porter, Diller & Stewart
ATTORNEYS

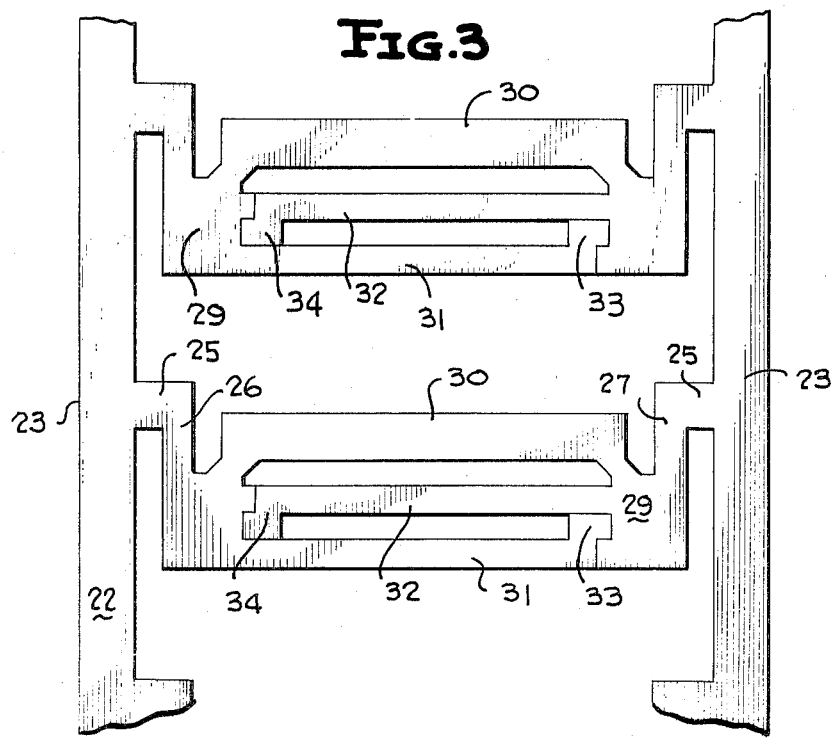
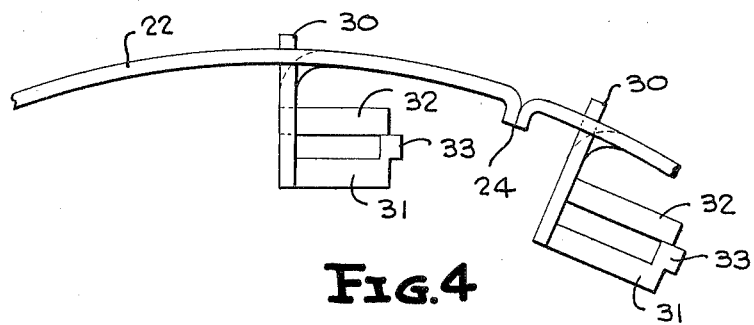
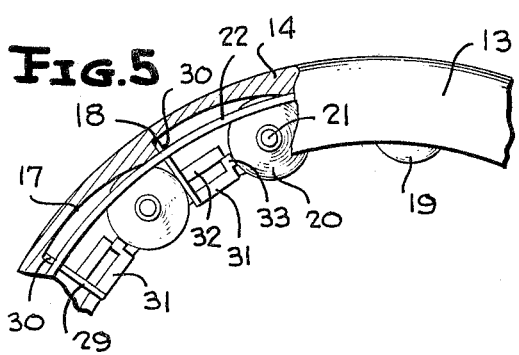
JOHN H. COWLES
INVENTOR

United States Patent Office 3,241,641
Patented Mar. 22, 1966

3,241,641
OVER-RUNNING ROLLER CLUTCH WITH
RESILIENT METAL CAGE
John H. Cowles, Forestville, Conn., assignor to The Torrington Company, Torrington, Conn., a corporation of Maine
Filed Oct. 10, 1963, Ser. No. 315,245
9 Claims. (Cl. 192—45)

The following specification is descriptive of an improved over-running clutch assembly for use wherever conditions of limited space, requirements for lightness, economy and durability are of prime consideration.

Over-running clutches are widely used in connection with driving or driven shafts of diverse machinery. Such clutches must give certain and reliable operation under severe conditions. In many instances, the machinery design restricts the available space in which the clutch must be accommodated.

One of the objects of this invention is to form the unit assembly with the outer clutch member similar to the sheet metal roller bearing of the well known cup type in which the integral ends of the shell are bent in toward the axis to retain a series of rollers and an associated cage or retainer. By the use of sheet metal for the outer shell or clutch member the parts may be more readily heat treated.

Another object of the invention is to reduce the overall dimensions of the clutch unit.

A still further object of the invention is to provide a cage or retainer of spring metal of great durability and capable of being heat treated with the shell.

A still further object of the invention is to form the outer clutch member of thin metal which may be readily formed to provide internal cam faces.

Among the objects of the invention is to provide a clutch unit, the parts of which are retained in position during storage, shipment and installation without requiring the shaft to be present.

Incidental to the above purpose is the control of the rollers so that they will be retained in the clutch unit without possibility of dislodgment or loss.

A further object of the invention is to provide a spring cage which will positively hold the rollers resiliently in clutch-engaging positions.

By the design of the spring cage there is an economy of space which will permit the use of more rollers and thus increase the capacity of the clutch.

An object of the invention is the production of an economical over-running clutch because the fabrication of the clutch lends itself to economical production methods.

The above and other objects of the invention have been shown by way of example on the accompanying drawings on which:

FIGURE 3 is an enlarged plan view of the blank from which the cage is formed;

FIGURE 4 is an enlarged fragmentary side elevation of the clutch roller retainer in final form and FIGURE 5 is an enlarged fragmentary side elevation partly in section of the sub-assembly of outer clutch member, cage and clutch rollers.

Figure 1:
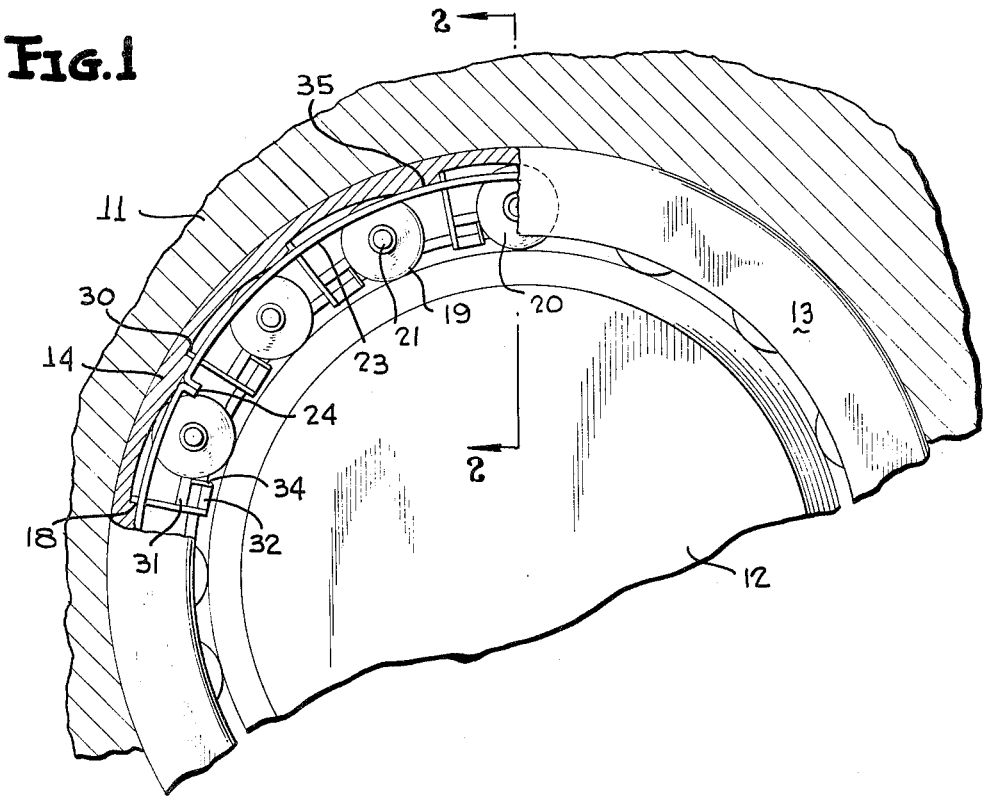
FIGURE 1 is an end elevation of the improved over-running clutch on a shaft and within a housing, partly in section.

The improved design of the over-running clutch allows the use of a sheet metal outer clutch member which can be press-fitted into a frame, hub, or other like machine part. The complete unit assembly is readily handled and installed without first mounting upon a shaft. The thin spring metal retainer or cage is particularly designed to provide adequate contact with the individual rollers and to insure that they are maintained with axes parallel to the center axis of the clutch itself.

On the drawings, the preferred form of the invention is illustrated as being installed within a housing 11. This may be a frame part of the machine or may be the hub of a wheel, gear, or the like. The housing is associated with a shaft 12.

The over-running clutch denoted generally 13, is a sheet metal cup of well known design press-fitted into the housing 11 and held there by frictional engagement. The cup is of malleable metal having inturned ends and may be hardened by heat treatment or otherwise.

The outer clutch member 14 is a thin cylindrical metal shell. Its diameter is such that it will be press-fitted into the housing.

This member 14 has integral ends 15, 15. In ordinary practice, one end is bent into position before the parts are assembled and the second end then bent inwardly to hold the rollers and cage in place. Each end 15 in final form will have an inturned flange 16. This flange serves to prevent the inward dislodgment of the individual rollers.

The inner surface of the clutch member 14 is in the form of a series of inclined ramps or cams 17. The high end of each cam meets the low end of the adjacent one with a radial wall 18.

Clutch rollers 19 are received loosely in each cam section. They are of such diameter that they are loose at the lower end of the cams, and when rolled to the high ends of the cams, are wedged between the shell 14 and the shaft 12 so that the two are locked together, thus forming an engaged clutch.

Each roller has shoulders 20 ending in trunnion ends 21.

The cage for the rollers is formed from a blank 22. This is of thin, resilient sheet metal or the like. This blank has sides 23. At opposite ends the blank is inturned to form abutting ends 24.

At spaced distances the ends of connecting sections or rim extensions 25, 25 extend toward the center. Side bars 26, 27 extend from the connecting sections 25 parallel to the sides 23. These side bars are part of a frame 29 which in final form is bent radially inwardly.

This frame has a cross-bar 30. This cross-bar extends radially outwardly.

The frame 29 also has transverse springs 31 and 32 extending from opposite sides of the frame. Members 31, 32 terminate in offset ends. Each end forms a Z-shaped pad 33, 34.

Offset portions 33, 34 are in transverse alignment.

The springs 31, 32 are bent at an angle to frame 29 as shown in FIGURE 4. The offset pads 34, 34 thus bear resiliently against the side of the adjacent roller 19, urging it up the slope of the cam into clutching engagement.

In assembling the unit, the cage is inserted so that the ends 24 abut and sides 23 are held concentric by annular surfaces 35. The cage is then rotated until the portion 30 rests against the walls 18.

Figure 2:
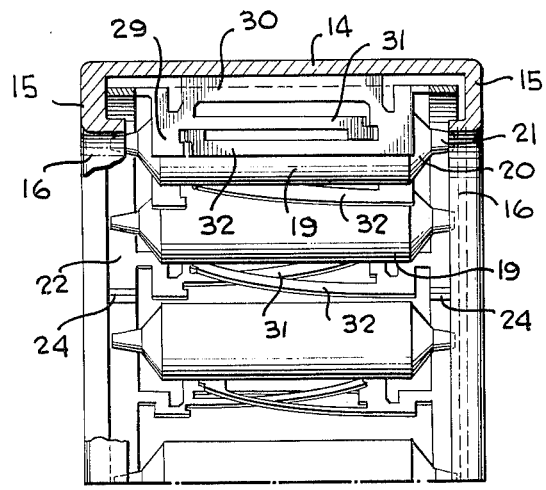
FIGURE 2 is a vertical cross-section on the line 2—2 in FIGURE 1.

The rollers 19 may then be fitted in place and the second side flange 16 turned into position as shown at the right in FIGURE 2.

The flanges 16 then hold the tapered ends 21 of the rollers against dislodgment.

The springs 31, 32 maintain even pressure on the rollers, so that they remain parallel to the axis of the unit.

The shoulders 20 permit the shaft 12 to be inserted easily to form a complete clutch unit.

This unit assembly can be manufactured and supplied to customers requiring an over-running clutch or one way clutch. The user in most instances will press fit the outer member into a frame member, pulley, gear, or the like. A shaft or shaft with a cylindrical race is placed within the bore of the sub-assembly. With the insertion of the shaft or the like the rollers are pushed out radially. For the rollers to move circumferentially they must travel up the ramps of the cam surfaces, thereby deflecting the springs 31, 32 causing a reaction spring force or push on the rollers opposite the deflexion. This force is in a direction to cause locking engagement of the rollers between the cam surfaces, roller, and shaft. As shown in FIGURE 1, lock-up will occur if the shaft attempts to turn in a clockwise direction or if the housing attempts to turn in a counterclockwise direction in relation to the other member. Opposite rotation allows overrunning or slippage. It is to be understood that the clutch may be installed for either hand operation.

This description of the invention has been shown in its preferred form solely by way of example. Desired changes in design, proportions and materials are possible without departing from the scope of the invention as defined in the following claims.

What I claim is:

1. An over-running clutch assembly comprising a cylindrical metal shell having a plurality of inner cam surfaces with intermediate radial walls and annular surfaces, inturned ends on the shell, a metal cage fitting against the radial walls and annular surfaces of the shell, said cage having a series of cross-bars with radial planes having their outer portions engaging said radial cam walls and forming compartments, integrally formed parallel springs on the cross bars and a roller in each compartment resting against said springs.

2. An over-running clutch assembly comprising a cylindrical thin metal shell having a plurality of inner cam surfaces with intermediate radial walls and annular surfaces, inturned ends on the shell, a spring metal cage fitting against the radial walls and annular surfaces of the shell, said cage having a series of cross-bars, said cross-bars bent into substantially radial planes with their outer portions engaging said radial cam walls and forming compartments, integrally formed parallel springs on the cross-bars and a roller in each compartment resting against said springs.

3. An over-running clutch assembly comprising a cylindrical thin metal shell having a plurality of inner cam surfaces with intermediate radial walls and annular surfaces, inturned ends on the shell, a thin spring metal cage fitting against the radial walls and annular surfaces of the shell, said cage having a series of cross-bars bent into radial planes with their outer portions engaging said radial walls and forming compartments, integrally formed oppositely directed parallel springs on each cross-bar and a roller in each compartment resting against said springs.

4. An over-running clutch assembly comprising a cylindrical thin metal shell having a plurality of inner cam surfaces with intermediate radial walls and annular surfaces, integrally formed inturned ends on the shell, a thin spring metal cage fitting against the radial walls and annular surfaces of the shell, said cage having a series of cross-bars bent into radial planes with their outer cross-portions engaging said radial walls and forming a series of compartments, oppositely directed springs on the cross-bars, aligned offset pads on the springs, a roller with trunnion ends in each compartment and a flange on each end of the shell disposed radially inwardly of the ends of the bearing rollers.

5. A cage for an over-running clutch of thin resilient metal having parallel rims and angularly disposed meeting ends, a series of spaced cross-bars, each cross-bar having extensions attached to said rims, side bars parallel to the rims, cross bar portions connecting the side bar portions, oppositely directed springs on the side bars and offset aligned pads on the springs.

6. A cage for an over-running clutch comprised of a thin resilient metal form having parallel rims and angularly disposed meeting ends, a series of spaced cross-bars, bent at right angles to the rims, each cross-bar having portions attached to said side bars parallel to the rims, cross-bar portions connecting the side bars, oppositely directed springs on the side bars and aligned offset pads on the springs.

7. A cage for an over-running clutch comprised of thin resilient metal form having parallel rims, a series of one-piece frames, rim extensions connected to said frames, said frames being bent at right angles to said rim extensions, and each frame having a cross-bar portion and oppositely directed springs spaced parallel to the said cross-bar portion.

8. A cage for an over-running clutch of thin resilient sheet metal having parallel rims, a series of spaced cross-bars, each cross-bar having extensions attached to said rims, side bars parallel to the rims, cross-bar portions connecting the side bar portions, oppositely directed springs on the side bars and offset aligned pads on the springs.

9. A cage for an over-running clutch of resilient metal having parallel rims, a series of spaced cross-bars; each cross-bar having extensions attached to said rims, side bars parallel to the rims, cross-bar portions connecting the side bar portions and integrally connected springs on the side bars extending in opposite directions towards each other.

References Cited by the Examiner

UNITED STATES PATENTS

| | | | |
|---|---|---|---|
| 2,342,227 | 2/1944 | Swenson | 192—45.1 |
| 2,630,896 | 3/1953 | Dodge | 192—45.1 |
| 2,940,567 | 6/1960 | Dodge | 192—45.1 |
| 3,011,606 | 12/1961 | Ferris et al. | 192—45 |
| 3,055,472 | 9/1962 | Sauzedde | 192—45 |

FOREIGN PATENTS 218,964   4/1942   Switzerland.

DAVID J. WILLIAMOWSKY, *Primary Examiner.*